(12) United States Patent
Kim et al.

(10) Patent No.: US 7,738,843 B2
(45) Date of Patent: Jun. 15, 2010

(54) APPARATUS AND METHOD FOR TRANSMITTING DATA IN MULTI-INPUT MULTI-OUTPUT SYSTEM

(75) Inventors: Tae Joon Kim, Daejeon (KR); Ik Soo Eo, Daejeon (KR); Hyoun Kuk Kim, Ulsan (KR); Hyun Chul Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 548 days.

(21) Appl. No.: 11/739,175

(22) Filed: Apr. 24, 2007

(65) Prior Publication Data

US 2007/0281636 A1 Dec. 6, 2007

(30) Foreign Application Priority Data

Jun. 1, 2006 (KR) .................. 10-2006-0049378

(51) Int. Cl.
H04B 1/02 (2006.01)
H04B 1/04 (2006.01)
H01Q 11/12 (2006.01)
H04M 1/00 (2006.01)

(52) U.S. Cl. .................. 455/91; 455/101; 455/102; 455/127.1; 455/522; 375/299

(58) Field of Classification Search .................. 455/91, 455/101–102, 127.1, 522; 375/295, 299, 375/312

See application file for complete search history.

(56) References Cited

U.S. PATENT DOCUMENTS 6,477,388 B1 * 11/2002 Schmutz ............... 455/522
6,529,496 B1 * 3/2003 Yeom et al. ............ 370/345
7,392,011 B1 * 6/2008 Jacomb-Hood .......... 455/13.4
7,453,947 B2 * 11/2008 Kim et al. ............. 375/267
7,515,655 B2 * 4/2009 Uchida et al. .......... 375/316
7,577,209 B2 * 8/2009 Poon .................... 375/267

(Continued)

FOREIGN PATENT DOCUMENTS

EP 1434365 6/2004

(Continued)

OTHER PUBLICATIONS

Want, N., et al., "Minimum BER Power Allocation for MIMO Spatial Multiplexing Systems." 2005. *IEEE* 0-7803-8938-7/05, pp. 2282-2286.

(Continued)

*Primary Examiner*—Simon D Nguyen
(74) *Attorney, Agent, or Firm*—Ladas & Parry LLP (57) ABSTRACT

Provided is a transmitter for a multi-input multi-output system including: a memory for storing a modulation system and power allocation coefficient for each antenna; a modulating unit for modulating data to be transmitted using the modulation system for each antenna stored in the memory when the data to be transmitted is input; and a power adjusting unit for adjusting the power according to the power allocation coefficient for each antenna stored in the memory to transmit the data to be transmitted, modulated at the modulating unit, via a corresponding antenna. A higher performance gain can be provided compared to a conventional open loop V-BLAST system by using a different modulation system and power for each antenna of a transmitter.

11 Claims, 5 Drawing Sheets

U.S. PATENT DOCUMENTS

| | | | |
|---|---|---|---|
| 2004/0032910 A1* | 2/2004 | Horng et al. | 375/267 |
| 2004/0171359 A1* | 9/2004 | Tirkkonen et al. | 455/127.1 |
| 2004/0192218 A1* | 9/2004 | Oprea | 455/73 |
| 2005/0047517 A1* | 3/2005 | Georgios et al. | 375/267 |
| 2005/0237971 A1* | 10/2005 | Skraparlis | 370/329 |
| 2005/0239509 A1 | 10/2005 | Li et al. | |
| 2006/0067417 A1* | 3/2006 | Park et al. | 375/260 |
| 2007/0230589 A1* | 10/2007 | Lozano | 375/260 |

FOREIGN PATENT DOCUMENTS

| | | |
|---|---|---|
| KR | 1020000002078 | 1/2000 |
| KR | 10-2003-0096927 | 12/2003 |
| KR | 1020040053435 | 6/2004 |
| KR | 1020040058440 | 7/2004 |
| KR | 1020050043670 | 5/2005 |
| KR | 1020050063420 | 6/2005 |
| KR | 1020050122143 | 12/2005 |

OTHER PUBLICATIONS

Golden, G.D., et al., "Detection algorithm and initial laboratory results using V-BLAST space-time communication architecture." Jan. 7, 1999. *Electronics Letters*, vol. 35, No. 1, pp. 14-16.

* cited by examiner

APPARATUS AND METHOD FOR TRANSMITTING DATA IN MULTI-INPUT MULTI-OUTPUT SYSTEM

CROSS-REFERENCE TO RELATED APPLICATION

This application claims priority to and the benefit of Korean Patent Application No. 2006-49378, filed Jun. 1, 2006, the disclosure of which is incorporated herein by reference in its entirety.

BACKGROUND

1. Field of the Invention

The present invention relates to a transmitter for a multi-input multi-output system and a method for transmitting data using the transmitter.

2. Discussion of Related Art

A radio channel having a multi-path is known to have high channel capacity, and it is expected that multi-input multi-output (MIMO) systems will be widely used in the future. In an MIMO system, proper space-time processing provides ample multi-path scattering on a communication channel, as is already known.

The Diagonal-Bell Labs Layered Space-Time (D-BLAST) system was introduced by Foschini in 1996. Here, when several antennas for a transmitter and a receiver and a diagonal arrangement of codes are used for communication, respective code blocks are propagated while being diagonally crossed in time and space. In this case, if a channel environment is a Rayleigh scattering environment and a transmitter and a receiver have the same number of antennas, a transfer rate linearly increases with the number of antennas, eventually approaching 90% of Shannon's channel capacity. This system, however, is complex and thus difficult to implement.

Meanwhile, the Vertical-Bell Labs Layered Space-Time (V-BLAST) system was suggested by Wolniansky in 1998. This system simplifies a conventional D-BLAST system by means of hardware implementation, but cannot accomplish maximum diversity and thus has deteriorated performance.

Figure 1:
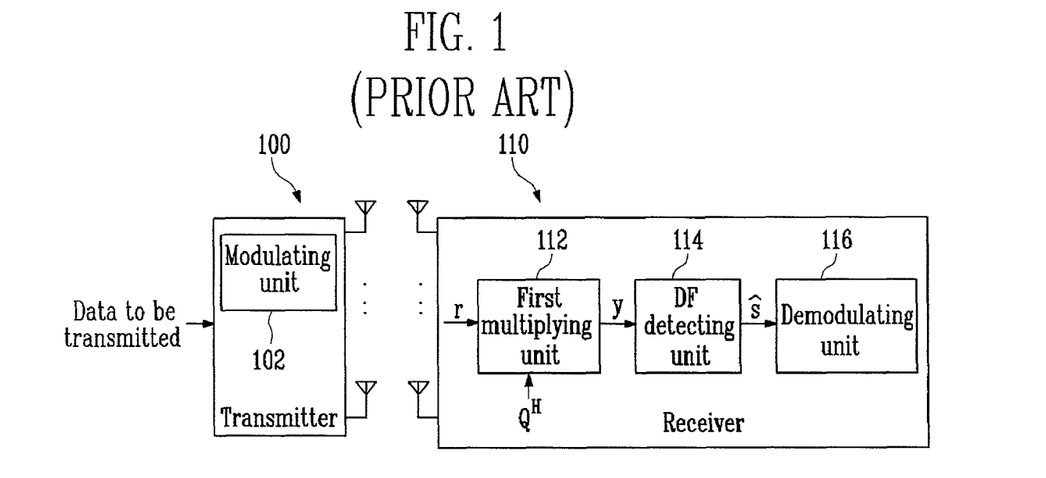
FIG. 1 illustrates a schematic configuration of a conventional MIMO communication system using V-BLAST.

FIG. 1 illustrates a schematic configuration of a conventional MIMO communication system using V-BLAST.

Referring to FIG. 1, a MIMO communication system using V-BLAST includes a transmitter 100 and a receiver 110.

The transmitter 100 includes a modulating unit 102 for modulating data to be transmitted using the same modulation system by applying the same modulation system to respective antennas, and the antennas for transmitting the data, modulated at the modulating unit 102, via channels.

The receiver 110 includes antennas for receiving symbols r via the channels, a first multiplying unit 112 for multiplying the symbols r received via the antennas by a Hermitian matrix Q, a decision feedback (DF) detecting unit 114 for performing decision feedback on a signal output from the first multiplying unit 112 to detect a transmitting vector, and a demodulating unit 116 for demodulating the transmitting vector output from the DF detecting unit 114 based on the system used for modulation at the modulating unit 102.

The DF detecting unit 114 detects a signal allowing a maximum signal-to-noise ratio among the signals received via the transmitting antennas and detects the transmitting vector by removing previous-stage interference at each stage. The DF detecting unit 114 then inputs the detected transmitting vector to the demodulator 116, which demodulates the transmitting vector received from the DF detecting unit 114.

As described above, in the V-BLAST system, data is transmitted using the same modulation system and power for each transmitting antenna.

In the conventional V-BLAST system, a transmitter and a receiver may have a simpler structure than in a D-BLAST system. In order to achieve high performance, however, the receiver becomes structurally complex.

When the system has a DF based receiver, it exhibits very low performance. Thus, it is difficult to apply to an actual system.

SUMMARY OF THE INVENTION

The present invention is directed to a transmitter for a multi-input multi-output system and a method for transmitting data which are capable of improving reception performance without changing a structure of a receiver in a V-BLAST system having a DF based receiver.

The present invention is also directed to a transmitter for a multi-input multi-output system and a method for transmitting data which are capable of transmitting data with a different modulation system and power coefficient assigned to each antenna.

One aspect of the present invention provides a transmitter for a multi-input multi-output system using multiple antennas, the transmitter including a memory for storing a modulation system and power allocation coefficient for each antenna; a modulating unit for modulating data to be transmitted using the modulation system for each antenna stored in the memory when the data to be transmitted is input; and a power adjusting unit for adjusting the power according to the power allocation coefficient for each antenna stored in the memory to transmit the data to be transmitted, modulated at the modulating unit, via a corresponding antenna.

Another aspect of the present invention provides a method for transmitting data at a transmitter for a multi-input multi-output system, the method including the steps of: checking a modulation system and power allocation coefficient for each antenna stored in a memory when data to be transmitted is input; modulating the data to be transmitted using the checked modulation system; and adjusting power according to the checked power allocation coefficient to transmit the data to be transmitted via a corresponding antenna.

Yet another aspect of the present invention provides a method for transmitting data at a transmitter for a multi-input multi-output system, the method including the steps of: obtaining and storing a modulation system and power allocation coefficient for each antenna using spectral efficiency and the number of transmitting antennas; checking the stored modulation system and power allocation coefficient for each antenna when data to be transmitted is input; modulating the data to be transmitted using the checked modulation system; and adjusting power according to the checked power allocation coefficient to transmit the data to be transmitted via a corresponding antenna.

Here, the step of obtaining and storing a modulation system and power allocation coefficient for each antenna using spectral efficiency and the number of transmitting antennas may include the steps of: generating a group of available modulation systems and assigning the modulation system to each antenna when the spectral efficiency and the number of transmitting antennas are input; calculating a lower bound of bit error rate for the modulation system of each antenna; selecting a modulation system with which the lower bound of the bit error rate for each antenna is minimized; obtaining a power allocation coefficient for each antenna using a parameter dependent on the selected modulation system; and storing the obtained modulation system and power allocation coefficient in a lookup table.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Figure 2:
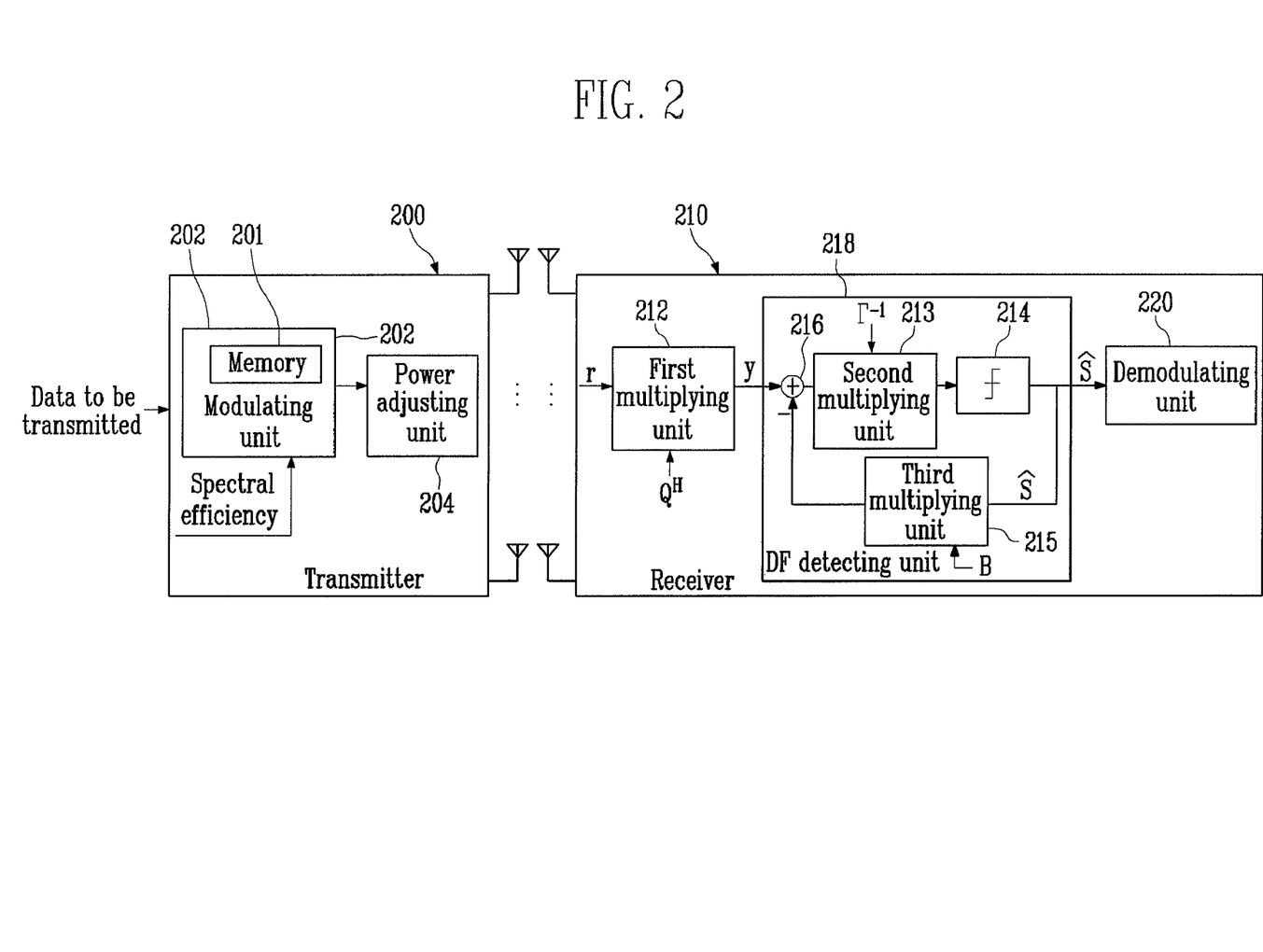
FIG. 2 illustrates a schematic configuration of a MIMO communication system using V-BLAST according to the present invention.

FIG. 2 illustrates a schematic configuration of a MIMO communication system using V-BLAST according to the present invention.

Referring to FIG. 2, a MIMO communication system using V-BLAST includes a transmitter 200 and a receiver 210.

The transmitter 200 applies a different modulation system and power allocation coefficient for each antenna to data to be transmitted.

The transmitter 200 includes a modulating unit 202 for modulating data to be transmitted using a different modulation system for each antenna, a power adjusting unit 204 for adjusting power for the data, modulated using the different modulation system at the modulating unit 202, by applying a different power allocation coefficient for each antenna to the data, and an antenna unit for transmitting, over a channel, the data whose power is adjusted at the power adjusting unit 204.

The modulating unit 202 includes a memory 201 storing a different modulation system and different power allocation coefficient for each antenna in a lookup table. When data to be transmitted is input, the modulating unit 202 reads out a modulation system and power allocation coefficient for each antenna from the memory 201 and applies them to the data to be transmitted so that the data is transmitted via each antenna.

The data to be transmitted refers to scrambled, encoded, or interleaved data to be transmitted by the transmitter. After receiving such data, the modulating unit 202 modulates the data and adjusts transmission power of the data using a different modulation system and power allocation coefficient for each antenna stored in the memory 201.

Modulation systems and power allocation coefficients for antennas, stored in the memory 201, are stored in a lookup table after once calculated upon system setting. Accordingly, once spectral efficiency is determined, the modulation system and the power allocation coefficient for each antenna are not changed.

Because both the transmitter 200 and the receiver 210 have the lookup table, the receiver 210 already knows a modulation system and power allocation coefficient for each antenna with respect to given spectral efficiency.

According to another aspect of the present invention, the memory 201, which stores a modulation system and power allocation coefficient for each antenna, may be external to the modulating unit 202.

A method of obtaining a modulation system and power allocation coefficient for each antenna stored in the memory 201 will be described below with reference to FIG. 4.

The receiver 210 receives signals from m transmitting antennas via the n receiving antennas, detects all data streams from the signals, and demodulates the data streams.

The receiver 210 includes antennas for receiving a symbol r via a channel, a first multiplying unit 212 for multiplying the symbol r received via the antennas by a Hermitian matrix Q, a decision feedback (DF) detecting unit 218 for performing decision feedback on a signal output from the first multiplying unit 212 to detect a transmitting vector, and a demodulating unit 220 for demodulating the transmitting vector output from the DF detecting unit 218 based on the system used for modulation at the modulating unit 202.

The DF detecting unit 218 includes a second multiplying unit 213 for multiplying the y vector output from the first multiplying unit 212 by $\Gamma^-$, a determining unit 214 for applying an optimal filter tap coefficient to the value output from the second multiplying unit 213 according to a certain determination criterion to output a determination value, i.e., transmitting vector, a third multiplying unit 215 for multiplying the transmitting vector output from the determining unit 214 by an off-diagonal term B, and a summing unit 216 for summing a vector output from the third multiplying unit 215 and the signal output from the first multiplying unit 212 to remove an interference component from a signal detected by a previous stage.

Here, $\Gamma^-$ indicates multiplying diagonal terms of an R matrix in reverse order. That is, because the R matrix is an upper triangular matrix, a transmitting signal corresponding to a last row of the matrix is first detected.

$\Gamma$ is equivalent to diag(R), and B is equivalent to R−$\Gamma$.

A method for detecting a transmitting vector at a receiver for the above system comprising $N_t$ transmitting antennas and $N_r$ receiving antennas will be described.

A received vector r input via the receiving antenna is represented by Equation 1:

$$r = Hs + n, \qquad \text{Equation 1}$$

where r indicates a received vector of $N_r \times 1$, H indicates a channel matrix $N_r \times N_t$, s indicates a transmitting vector $N_t \times 1$, and n indicates a noise vector $N_r \times 1$. For the transmitting vector, each antenna uses a different modulation system and a different power.

When the channel transfer function matrix H containing channel information in Equation 1 is subject to QR decomposition, it can be represented as the following: H=QR, where Q is a unitary matrix and R is an tipper triangular matrix.

When a QR decomposition result of the channel transfer function matrix H is applied to Equation 1, r=QRs+n.

If the obtained r is multiplied by a Hermitian matrix Q at the first multiplying unit 212, Equation 1 becomes Equation 2:

$$r = Hs + n \qquad \text{Equation 2}$$
$$= QRs + n$$
$$y = Q^H r = Rs + n,$$

It can be seen from Equation 2 that signal detection can be made using the DF-based receiver since the R matrix is an upper triangular matrix.

As in Equation 2, the y vector output from the first multiplying unit 212 is input to the DF detecting unit 218.

The second multiplying unit 213 then multiplies the y vector output from the first multiplying unit 212 by $\Gamma^-$ and inputs the result to the determining unit 214. The determining unit 214 then receives the value output from the second multiplying unit 213, outputs a determination value determined according to a predetermined determination criterion, i.e., a transmitting vector, and inputs the transmitting vector to the third multiplying unit 215 and the demodulating unit 220.

In this case, the value of a signal in any stage is represented by Equation 3:

$$y_i = \underbrace{R_{ii}s_i}_{desired\ signal} + \underbrace{\sum_{j<i} R_{ij}s_j}_{interference\ component} + n'_i, \ 1 \leq i \leq N_t \qquad \text{Equation 3}$$

$$\begin{cases} |R_{ii}|^2 \sim \chi^2_{2(N_r-N_t+1)} \\ |R_{ij}|^2 \sim \chi^2_2, \ i \neq j \end{cases},$$

where $R_{ii}S_i$ indicates a desired signal, and $$\sum_{j<i} R_{ij}s_j$$

indicates an interference component.

It can be seen from Equation 3 that there is a difference in diversity gain exhibiting maximum performance at each stage of the DF-based receiver. Because the R matrix is an upper triangular matrix, a transmitting signal corresponding to a last row of the matrix is first detected.

The third multiplying unit 215 multiplies the transmitting vector output from the determining unit 214 by an off-diagonal term (B) and inputs a resulting vector to the summing unit 216. The summing unit 216 then sums the vector output from the third multiplying unit 215 and the signal output from the first multiplying unit 212 to remove an interference component from a signal detected at a previous stage, and inputs a resulting signal together with the y vector output from the first multiplying unit 212 to the second multiplying unit 213.

A signal as represented by Equation 4 is detected by removing the interference component from the previous stage through the above process:

$$y_i = R_{ii}s_i + \sum_{j<i} R_{ij}(s_j - \hat{s}_j) + n'_i, \ 1 \leq i \leq N_t \qquad \text{Equation 4}$$

It can be seen from Equation 4 that maximum diversity gain cannot be obtained if interference is not adequately removed. In addition, since a previous stage exhibits low signal performance when interference is removed at any stage of the receiver, error propagation is severe and high performance cannot be obtained.

It can also be seen that overall performance is determined by signal performance exhibiting a minimum diversity gain since there is a difference in a maximum diversity gain that can be obtained at each stage even though no error is propagated. That is, it can be seen that performance gain is obtained in spite of the use of the DF-based receiver when a transmitter assigns a modulation system and a power in order to minimize the lower bound of the performance of the receiver.

Accordingly, the modulation system and the power allocation coefficient for each antenna stored in the transmitter may be a modulation system and a power allocation coefficient by which a lower bound of bit error rate is minimized.

In the above MIMO communication system using V-BLAST, a method for transmitting data at a transmitter will now be described with reference to FIG. 3.

Figure 3:
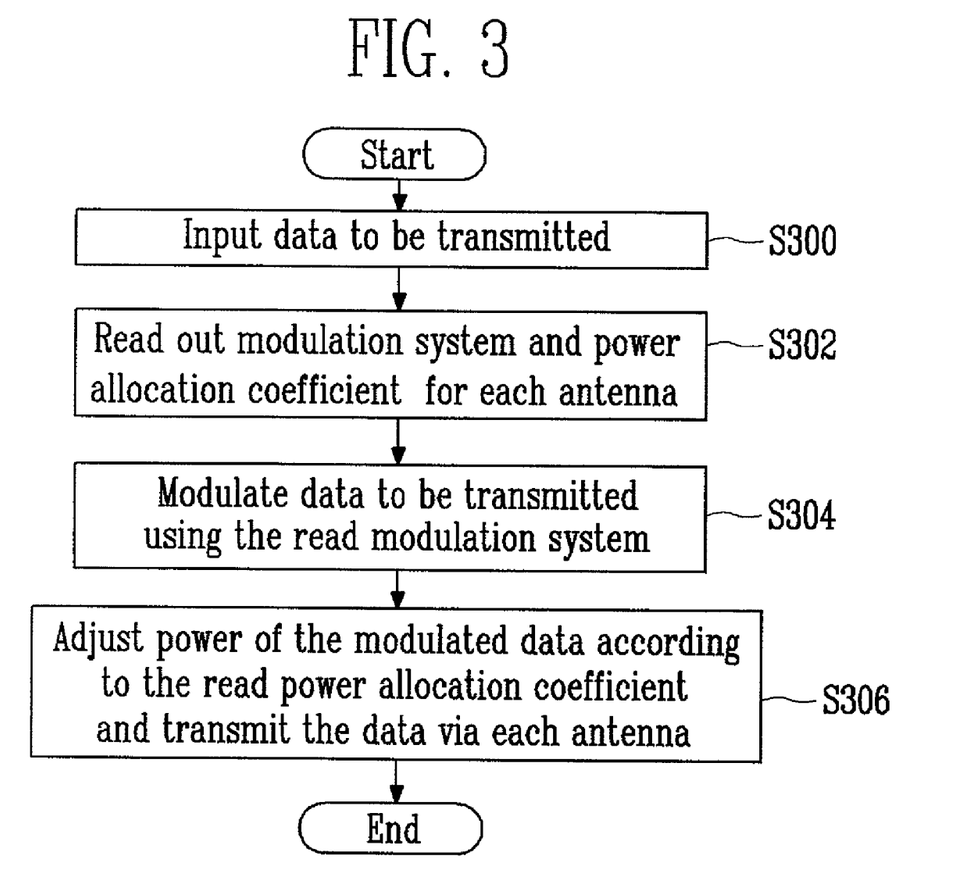
FIG. 3 is a flowchart illustrating a method for transmitting data at a transmitter according to the present invention.

FIG. 3 is a flowchart illustrating a method for transmitting data at a transmitter according to the present invention.

Referring to FIG. 3, when data to be transmitted is input (S300), a transmitter reads out a modulation system and power allocation coefficient for each antenna from a memory (S302).

Here, the data to be transmitted refers to data that the transmitter desires to transmit, such as scrambled, encoded, and interleaved data. When such data is input from outside, a modulating unit modulates the data and adjusts the transmission power of the data using the modulation system and the power allocation coefficient stored in the memory.

The modulation system and the power allocation coefficient for each antenna are stored in a lookup table in the memory in advance.

After step 302, the transmitter modulates the input data using the modulation system for each antenna read from the memory (S304), adjusts power of the modulated data according to the read power allocation coefficient, and transmits the data via a corresponding antenna (S306).

For example, it is assumed that the transmitter comprises four antennas: a first antenna using a BPSK modulation system, a second antenna using an 8PSK modulation system, a third antenna using a 64QAM modulation system, and a fourth antenna using a 64QAM modulation system, all of which are stored in the memory.

In this case, the transmitter modulates data to be transmitted using the BPSK, 8PSK, and 64QAM modulation systems. Then, the first antenna transmits the data modulated using the BPSK modulation system, the second antenna transmits the data modulated using the 8PSK modulation system, and the third and fourth antennas transmit the data modulated using the 64QAM modulation system.

In this manner, the transmitter transmits the data to the receiver using a different modulation and power for each antenna. The receiver then demodulates the data using the modulation system and the power used at the transmitter.

Figure 4:
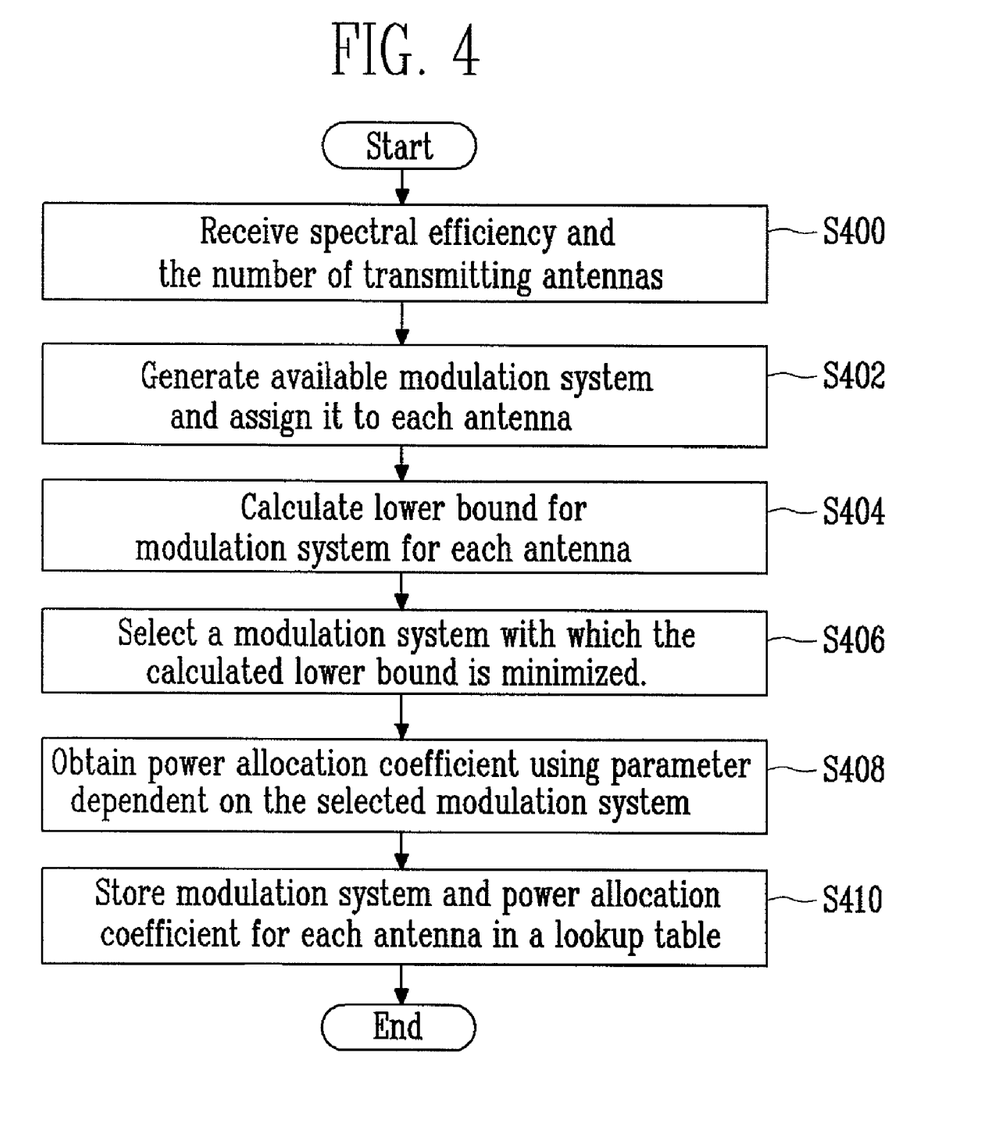
FIG. 4 is a flowchart illustrating a method for obtaining a modulation system and power allocation coefficient for each antenna according to the present invention.

FIG. 4 is a flowchart illustrating a method for obtaining a modulation system and power allocation coefficient for each antenna according to the present invention.

Referring to FIG. 4, when spectral efficiency and the number of transmitting antennas are input (S400), a modulation system and power allocation coefficient calculator generates a group of available modulation systems and assigns it to each antenna (S402). Here, the modulation system and power allocation coefficient calculator may be a device internal or external to the transmitter.

The modulation system and power allocation coefficient calculator holds available modulation systems determined depending on the spectral efficiency and the number of transmitting antennas. Accordingly, when the spectral efficiency and the number of transmitting antennas are input, the calculator assigns the pre-stored available modulation system to each antenna.

For example, if the number of transmitting antennas is 4 and the available modulation systems are BPSK, 8PSK, and 64QAM, the modulation system and power allocation coefficient calculator assigns BPSK, 8PSK, 64QAM and 64QAM to the four antennas, respectively.

After step 402, the modulation system and power allocation coefficient calculator calculates a lower bound of bit error rate $P_{b,i}(\text{error}|R_{ii})$ for the assigned modulation system for each antenna (S404), and selects a modulation system with which the calculated lower bound is minimized (S406).

That is, if interference is not adequately removed in Equation 4, maximum diversity gain cannot be obtained. In addition, when interference is removed at any stage, error propagation is severe since a previous stage exhibits low signal performance. Thus, excellent performance cannot be obtained.

It can be seen that overall performance is determined by performance of a signal at which the diversity gain is minimized since there is a difference in maximum diversity gain that can be obtained at the respective stages even when there is no error propagation (this corresponds to the lower bound of the performance).

That is, it can be seen that performance gain is obtained in spite of the use of the DF based receiver, by the transmitter assigning the modulation system and the power to minimize the lower bound of the receiver performance.

As a result, the lower bound of bit error rate in one channel establishment at the receiver can be obtained using Equation 5:

$$P_{b,i}(\text{error}|R_{ii}) \approx \frac{1}{N_t}\sum_{i=1}^{N_t} \alpha_i \exp(-|R_{ii}|^2 \beta_i P_i \rho), \quad \text{Equation 5}$$

where $N_t$ indicates the number of transmitting antennas, $\alpha_i$ and $\beta_i$ indicate parameter values dependent on a modulation system, $\rho$ indicates a signal to noise ratio, and $P_i$ indicates power assigned to the i-th transmitting antenna.

Equation 5 indicates a lower bound of the system when a channel is once established. If a lower bound is calculated to assign a modulation system and power coefficient each time a new channel is established, feedback to the transmitting terminal cannot be avoided.

Since the lower bound is a lower bound for a fixed average signal-to-noise ratio rather than an instantaneous value, no feedback is required.

The average lower bound can be obtained using Equation 6:

$$\overline{P_{b,i}}(\text{error}) \approx \frac{1}{N_t}\sum_{i=1}^{N_t} \alpha_i \exp(1+\beta_i P_i \rho)^{-i} \quad \text{Equation 6}$$

In Equation 6, it is assumed upon calculation that $P_i$ is '1' in order to select a modulation system providing a minimum lower bound.

A modulation system with which an average lower bound is minimized can be selected by solving Equation 6. In this case, since $N_t$, $\alpha_i$, $\beta_i$, and $\rho$ are given values and $P_i$ is 1, the average lower bound can be obtained. The smallest one of the average lower bounds obtained for the each antenna is selected, and a modulation system applied to the selected smallest value is selected as a modulation system for the antenna.

After step 406, the modulation system and power allocation coefficient calculator applies a parameter, dependent on the modulation system selected in step 404, to Equation 8 in order to obtain a power allocation coefficient (S408).

The lower bound minimization can be represented using a multiplier, and the smallest lower bound can be obtained using Equation 7:

$$\text{Min } P_{b,i}(\text{error}|R_{ii}) = \text{Min}\frac{1}{N_t}\sum_{i=1}^{N_t} \alpha_i \exp(1+\beta_i P_i \rho)^{-i} \quad \text{Equation 7}$$

$$\text{such that } \sum_{i=1}^{N_t} P_i = N_t$$

$$J(P_1, P_2, \ldots, P_{N_t}, \lambda) =$$

$$\frac{1}{N_t}\sum_{i=1}^{N_t}\alpha_i \exp(1+\beta_i P_i \rho)^{-i} + \lambda\left(\sum_{i=1}^{N_t} P_i = N_t\right) \Rightarrow$$

$$\frac{\partial J(P_1, P_2, \ldots, P_{N_t}, \lambda)}{\partial P_i} =$$

$$0 \text{ and } \frac{\partial J(P_1, P_2, \ldots, P_{N_t}, \lambda)}{\partial \lambda} = 0$$

Equation 7 can be approximated as Equation 8 when a signal-to-noise ratio is high.

$$P_i = \frac{1}{\beta_i \rho}\left(\frac{i\alpha_i \beta_i \beta_1 P_1}{\alpha_1}\rho\right)^{\frac{1}{i+1}} \text{ and } \sum_{i=1}^{N_t} P_i = N_t \quad \text{Equation 8}$$

Accordingly, a power allocation coefficient assigned to each antenna can be obtained by solving Equation 8.

After step 408, the obtained modulation system and power allocation coefficient for each antenna are stored in a lookup table (S410).

For example, it can be seen from Table 1 that a conventional open-loop V-BLAST system with a spectral efficiency of 16 bps/Hz, comprising four transmitting antennas and four receiving antennas, uses 16QAM. In contrast, the inventive system uses BPSK, 8PSK, 64QAM and 64QAM, and power allocation coefficients of 0.941, 0.907, 1.297, and 0.856. Thus, the modulation systems and the power allocation coefficients for each antenna differ.

TABLE 1

| | Transmitting Method | | | |
| --- | --- | --- | --- | --- |
| | Antenna 1 | Antenna 2 | Antenna 3 | Antenna 4 |
| Prior art | 16QAM | 16QAM | 16QAM | 16QAM |
| The present invention | BPSK(0.941) | 8PSK(0.907) | 64QAM(1.297) | 64QAM(0.856) |

Figure 5:
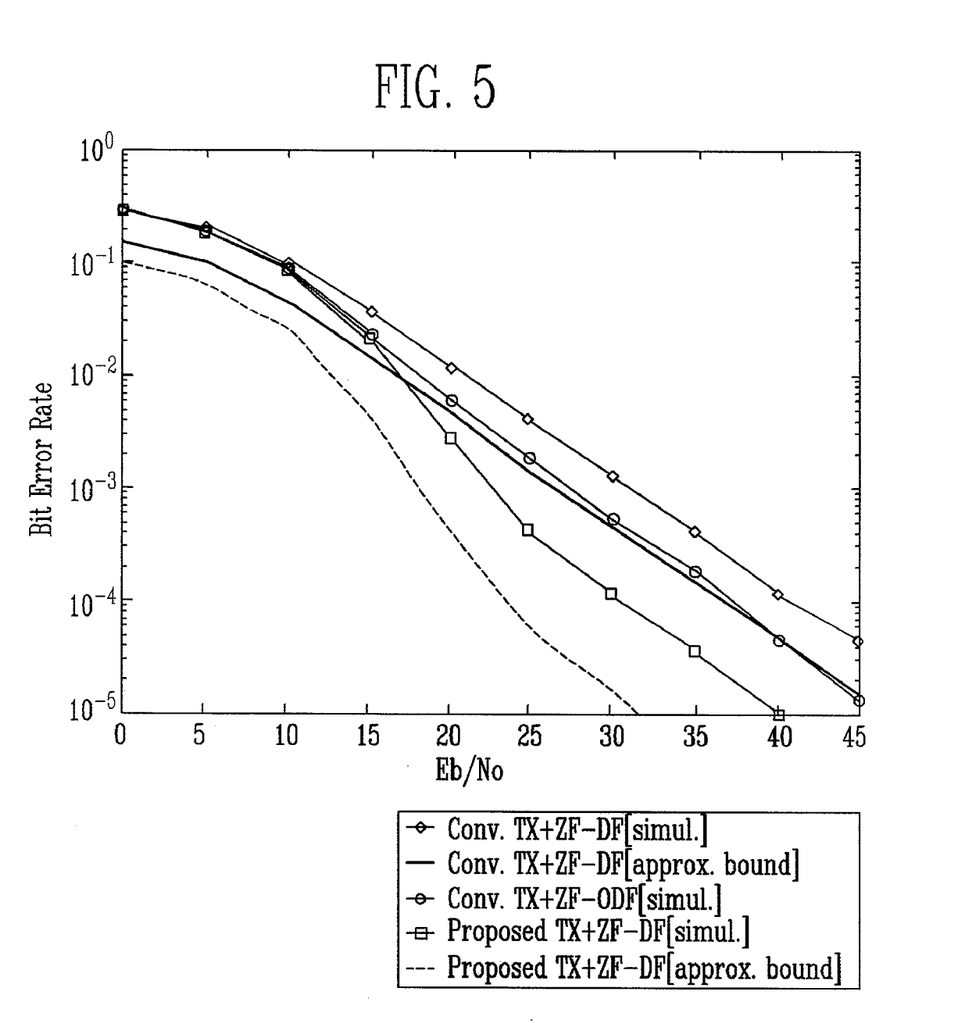
FIG. 5 is a graph illustrating a comparison in performance between transmission systems for a transmitter according to the present invention.

FIG. 5 is a graph illustrating a comparison in performance between data transmission systems for a transmitter according to the present invention.

Referring to FIG. 5, the present invention provides a performance gain of about 8.5 dB for a bit error rate of $10^{-3}$ when a ZF-DF receiver is used. The present invention also provides improved performance gain of about 5.0 dB even when a ZF-ODF receiver is applied to a conventional transmission system. While the ZF-ODF commonly requires about $N_t$ times complexity compared to the ZF-DF, the present invention can provide excellent performance gain with lower complexity.

The method of the present invention may be implemented as a program and then stored in a computer-readable recording medium. This can be easily practiced by those skilled in the art and thus further description will be omitted.

As described above, according to the present invention, it is possible to provide a transmitter for a multi-input multi-output system and a method for transmitting data which are capable of providing higher performance gain compared to a conventional open-loop V-BLAST system by using a different modulation system and power for each transmitting antenna.

According to the present invention, it is also possible to provide a transmitter for a multi-input multi-output system and a method for transmitting data which do not require feedback of a power coefficient by using a lower bound of bit error rate with respect to a fixed average signal-to-noise ratio.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A transmitter for a multi-input multi-output system using multiple antennas, the transmitter comprising:
   a memory for storing a modulation system and power allocation coefficient for each antenna;
   a modulating unit for modulating data to be transmitted using the modulation system for each antenna stored in the memory when the data to be transmitted is input; and
   a power adjusting unit for adjusting the power according to the power allocation coefficient for each antenna stored in the memory to transmit the data to be transmitted, modulated at the modulating unit, via a corresponding antenna,
   wherein the stored modulation system and power allocation coefficient used for each of the antennas when the data is transmitted comprises:
      generating a group of available modulation systems and assigning the modulation system to each antenna when the spectral efficiency and the number of transmitting antennas are input;
      calculating a lower bound of bit error rate for the modulation system of each antenna;
      selecting a modulation system with which the lower bound of the bit error rate for each antenna is minimized;
      obtaining a power allocation coefficient for each antenna using a parameter dependent on the selected modulation system; and
      storing the obtained modulation system and power allocation coefficient in a lookup table,
   wherein the lower bound of the bit error rate is obtained using $$\overline{P_{b,i}}(\text{error}) \approx \frac{1}{N_t}\sum_{i=1}^{N_t} \alpha_i \exp(1+\beta_i P_i \rho)^{-i},$$

where $N_t$ indicates the number of transmitting antennas $\alpha_i$ and $\beta_i$ indicate parameter values dependent on a modulation system, $\rho$ indicates a signal to noise ratio and $P_i$ indicates power assigned to the i-th transmitting antenna and $P_i$ is 1 in here.

2. The transmitter of claim 1, wherein the memory is in the modulating Unit.

3. The transmitter of claim 1, wherein the data to be transmitted is scrambled, encoded, and interleaved data.

4. The transmitter of claim 1, wherein the modulation system and the power allocation coefficient for each antenna are obtained using spectral efficiency and the number of transmitting antennas.

5. The transmitter of claim 1, wherein the modulation system and the power allocation coefficient for each antenna are not changed once the spectral efficiency is determined.

6. The transmitter of claim 1, wherein the modulation system and the power allocation coefficient for each transmitting antenna in the memory are stored in a lookup table.

7. A method for transmitting data at a transmitter for a multi-input multi-output system, the method comprising the steps of:
   checking a modulation system and power allocation coefficient for each antenna stored in a memory when data to be transmitted is input;
   modulating the data to be transmitted using the checked modulation system; and
   adjusting power according to the checked power allocation coefficient to transmit the data to be transmitted via a corresponding antenna,
   wherein the stored modulation system and power allocation coefficient used for each of the antennas when the data is transmitted comprises:
      generating a group of available modulation systems and assigning the modulation system to each antenna when the spectral efficiency and the number of transmitting antennas are input;
      calculating a lower bound of bit error rate for the modulation system of each antenna;
      selecting a modulation system with which the lower bound of the bit error rate for each antenna is minimized;
      obtaining a power allocation coefficient for each antenna using a parameter dependent on the selected modulation system; and
      storing the obtained modulation system and power allocation coefficient in a lookup table,
   wherein the lower bound of the bit error rate is obtained using $$\overline{P_{b,i}}(\text{error}) \approx \frac{1}{N_t}\sum_{i=1}^{N_t} \alpha_i \exp(1+\beta_i P_i \rho)^{-i},$$

where $N_t$ indicates the number of transmitting antennas, $\alpha_i$ and $\beta^i$ indicate parameter values dependent on a modulation system, $\rho$ indicates a signal to noise ratio, and $P_i$ indicates power assigned to the i-th transmitting antenna and $P_i$ is 1 in here.

8. A method for transmitting data at a transmitter for a multi-input multi-output system, the method comprising the steps of:

obtaining and storing a modulation system and power allocation coefficient for each antenna using spectral efficiency and the number of transmitting antennas;

checking the stored modulation system and power allocation coefficient for each antenna when data to be transmitted is input;

modulating the data to be transmitted using the checked modulation system; and adjusting power according to the checked power allocation coefficient to transmit the data to be transmitted via a corresponding antenna, wherein the step of obtaining and storing a modulation system and power allocation coefficient for each antenna using spectral efficiency and the number of transmitting antennas comprises:

generating a group of available modulation systems and assigning the modulation system to each antenna when the spectral efficiency and the number of transmitting antennas are input;

calculating a lower bound of bit error rate for the modulation system of each antenna;

selecting a modulation system with which the lower bound of the bit error rate for each antenna is minimized;

obtaining a power allocation coefficient for each antenna using a parameter dependent on the selected modulation system; and storing the obtained modulation system and power allocation coefficient in a lookup table, wherein the lower bound of the bit error rate is obtained using $$\overline{P_{b,i}}(\text{error}) \approx \frac{1}{N_t} \sum_{i=1}^{N_t} \alpha_i \exp(1 + \beta_i P_i \rho)^{-i},$$

where $N_t$ indicates the number of transmitting antennas, $\alpha_i$ and $\beta_i$ indicate parameter values dependent on a modulation system, $\rho$ indicates a signal to noise ratio, and $P_i$ indicates power assigned to the i-th transmitting antenna and $P_i$ is 1 in here.

9. The method of claim 8, wherein the available modulation system is determined in advance according to the spectral efficiency and the number of transmitting antennas.

10. The method of claim 8, wherein the lower bound of the bit error rate is a lower bound for a fixed average signal-to-noise ratio.

11. The method of claim 8, wherein the power allocation coefficient is obtained by $$P_i = \frac{1}{\beta_i \rho} \left( \frac{i \alpha_i \beta_i \beta_1 P_1}{\alpha_1} \rho \right)^{\frac{1}{i+1}} \text{ and } \sum_{i=1}^{N_t} P_i = N_t,$$

where $N_t$ indicates the number of transmitting antennas, $\alpha_i$ and $\beta_i$ indicate parameter values dependent on a modulation system, $\rho$ indicates a signal to noise ratio, and $P_i$ indicates power assigned to the i-th transmitting antenna.

* * * * *